United States Patent
Chatel-Pelage et al.

(10) Patent No.: US 7,066,728 B2
(45) Date of Patent: Jun. 27, 2006

(54) PROCESS AND APPARATUS FOR OXYGEN ENRICHMENT IN FUEL CONVEYING GASES

(75) Inventors: Fabienne Chatel-Pelage, Chicago, IL (US); Ovidiu Marin, St. Cloud (FR); Scott Macadam, Laramie, WY (US); Erwin Penfornis, Oak Park, IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 10/758,607

(22) Filed: Jan. 15, 2004

(65) Prior Publication Data

US 2004/0185404 A1 Sep. 23, 2004

Related U.S. Application Data

(60) Provisional application No. 60/441,508, filed on Jan. 21, 2003.

(51) Int. Cl.
*F23M 3/00* (2006.01)

(52) U.S. Cl. .......................................... 431/9; 431/183
(58) Field of Classification Search ................ 431/8, 431/9, 183, 351, 65; 239/424.5, 406
See application file for complete search history.

(56) References Cited

U.S. PATENT DOCUMENTS

| 3,656,878 | A |   | 4/1972 | Wright |
| 3,699,903 | A |   | 10/1972 | King |
| 4,217,132 | A | * | 8/1980 | Burge et al. ................ 431/9 |
| 4,253,403 | A |   | 3/1981 | Vatsky |
| 4,257,763 | A |   | 3/1981 | Reed |
| 4,329,932 | A | * | 5/1982 | Takahashi et al. .......... 110/347 |
| 4,427,362 | A |   | 1/1984 | Dykema |
| 4,495,874 | A |   | 1/1985 | Greskovich et al. |

(Continued)

FOREIGN PATENT DOCUMENTS

| EP | 0474 524 | 7/1991 |
| FR | 875 509 | 9/1942 |
| JP | 2002-364833 | 12/2002 |
| WO | WO 99 08045 | 2/1999 |
| WO | WO 02 103241 A1 | 12/2002 |

OTHER PUBLICATIONS

Garrido G.F., Perkins A.S., Ayton J.R., Upgrading Lime Recovery with $O_2$ Enrichment, CPPA Conference, Montreal, Jan. 1981.

Sarofin, A.F. et al., "Strategies for Controlling Nitrogen Oxide Emissions during Combustion of Nitrogen–bearing fuels", Proceedings of the 69th Annual Meeting of the A.I.CH.E., Chicago, Nov. 1976.

K. Moore, W. Ellison, "Fuel Rich Combustion, A Low Cost $NO_x$ Control Means for Coal–fired Plants," 25th International Technical Conference on Coal Utilization & Fuel Systems, Clearwater, Florida, Mar. 2000.

Patent Abstracts of Japan; publication No. 60023717; publication date Jun. 2, 1985; application date Jul. 20, 1983; U.S. Appl. No. 58/131,021.

International Search Report for PCT/IB2004/000089.

U.S. Application No. SIR H19, filed Feb. 4, 1986, Carlson.

*Primary Examiner*—Stephen Gravini
(74) *Attorney, Agent, or Firm*—Christopher J. Cronin (57) ABSTRACT

An improved process for burning solid fuel particles in a combustion chamber and creating a flue gas is disclosed. The method comprises creating a fuel gas stream by mixing the solid fuel particles with a conveying gas, transporting the fuel gas stream through a fuel duct terminating at the combustion chamber at a fuel exit plane and injecting an oxygen stream through an injection device into said fuel gas at an oxygen injection location selected to create a mixing zone to mix the oxygen stream and the fuel gas stream immediately prior to or coincident with combustion of the fuel. Operating parameters of the process can be varied to optimally reduce $NO_x$ emissions.

31 Claims, 9 Drawing Sheets

U.S. PATENT DOCUMENTS

| | | |
|---|---|---|
| 4,556,384 A | 12/1985 | Laurenceau |
| 4,591,331 A | 5/1986 | Moore |
| 4,672,900 A | 6/1987 | Santalla et al. |
| 4,690,074 A * | 9/1987 | Norton .................... 110/264 |
| 4,797,087 A | 1/1989 | Gitman |
| 4,899,670 A | 2/1990 | Hansel |
| 5,158,445 A | 10/1992 | Khinkis |
| 5,186,617 A | 2/1993 | Ho |
| 5,291,841 A | 3/1994 | Dykema |
| 5,308,239 A | 5/1994 | Bazarian et al. |
| 5,356,213 A * | 10/1994 | Arpentinier ............ 366/165.1 |
| 5,359,967 A | 11/1994 | Carter et al. |
| 5,387,100 A | 2/1995 | Kobayashi |
| 5,411,394 A * | 5/1995 | Beer et al. .................... 431/9 |
| 5,413,476 A | 5/1995 | Baukal, Jr. et al. |
| 5,431,557 A | 7/1995 | Hamos |
| 5,454,712 A | 10/1995 | Yap |
| 5,715,764 A | 2/1998 | Lyngfelt et al. |
| 5,725,366 A | 3/1998 | Khinkis et al. |
| 5,759,022 A | 6/1998 | Koppang et al. |
| 5,871,343 A | 2/1999 | Baukal, Jr. et al. |
| 5,908,003 A * | 6/1999 | Hura et al. ................ 110/345 |
| 5,915,310 A | 6/1999 | Hura et al. |
| 5,950,547 A | 9/1999 | Wachendorfer |
| 6,000,930 A | 12/1999 | Kelly et al. |
| 6,007,326 A | 12/1999 | Ryan, III et al. |
| 6,070,410 A | 6/2000 | Dean |
| 6,085,674 A | 7/2000 | Ashworth |
| 6,142,765 A * | 11/2000 | Ramaseder et al. ............ 431/9 |
| 6,206,949 B1 | 3/2001 | Kobayashi et al. |
| 6,238,206 B1 | 5/2001 | Cummings, III et al. |
| 6,244,854 B1 * | 6/2001 | Satchell et al. ................ 431/8 |
| 6,276,928 B1 | 8/2001 | Joshi et al. |
| 6,314,896 B1 | 11/2001 | Marin et al. |
| 6,394,790 B1 | 5/2002 | Kobayashi |
| 6,685,464 B1 | 2/2004 | Marin et al. |
| 6,705,117 B1 | 3/2004 | Simpson et al. |
| 6,715,432 B1 | 4/2004 | Tsumura et al. |
| 6,813,902 B1 | 11/2004 | Streicher et al. |
| 2002/0127505 A1 | 9/2002 | Kobayashi et al. |
| 2002/0144636 A1 | 10/2002 | Tsumura et al. |
| 2003/0009932 A1 | 1/2003 | Kobayashi et al. |
| 2003/0021182 A1 | 1/2003 | Illy et al. |
| 2003/0091948 A1 | 5/2003 | Bool, III et al. |
| 2003/0099912 A1 | 5/2003 | Kobayashi et al. |
| 2003/0099913 A1 | 5/2003 | Kobayashi et al. |
| 2003/0104328 A1 | 6/2003 | Kobayashi et al. |
| 2003/0108833 A1 | 6/2003 | Kobayashi et al. |
| 2004/0074426 A1 | 4/2004 | Kobayashi et al. |
| 2004/0074427 A1 | 4/2004 | Kobayashi et al. |

* cited by examiner

PROCESS AND APPARATUS FOR OXYGEN ENRICHMENT IN FUEL CONVEYING GASES

CROSS REFERENCE TO RELATED APPLICATION

This application claims the benefit of U.S. Provisional Application No. 60/441,508, filed Jan. 21, 2003.

BACKGROUND OF THE INVENTION

1. Field of the Invention

This invention relates to the field of oxygen enrichment in fuel conveying gases for use in combustion.

2. Related Art

Oxygen enrichment in all kinds of combustion systems is a well known and growing method already implemented in many industrial processes to improve combustion characteristics, both in terms of efficiency, product quality and pollutant emission levels. These include glass furnaces, cement and lime kilns, and aluminum or steel processes. For example, oxygen enrichment in lime kilns has been described in Garrido G. F., Perkins A. S., Ayton J. R., UPGRADING LIME RECOVERY WITH $O_2$ ENRICHMENT, CPPA Conference, Montreal, January 1981. Pure or substantially pure oxygen may be used as the only oxidant for some specific applications, often referred to as "full oxygen" furnaces. It can also be effective when added as a complementary oxidant in an existing air-fired combustion system, either through the ports enabling the air stream to flow into the combustor or through additional ports added for pure oxygen or oxygen-enriched air injection. This last case is often referred to as "oxygen-enriched" combustion or "oxygen-enhanced" combustion Two principal alternatives can be implemented for oxygen enrichment, either premixing the oxygen, usually in at least some of the existing air to form an oxygen-enriched oxidant stream, or injecting the oxygen directly into the combustion chamber. Premixing can be achieved by injecting the $O_2$ in some of the main air-ducts, to produce a homogeneous, oxygen enriched stream for introduction into the combustion chamber. Direct injection can be achieved through substantially pure $O_2$ lancing into the combustion chamber, through specific ports apart from existing air ports, or through existing air ports, the oxygen lances being surrounded by the main air stream without mixing into this air stream before the exit to the combustion chamber.

The furnaces thus described that employ pure $O_2$ streams or oxygen enriched streams operate with gaseous or liquid fuels such as natural gas or oil. In those cases, all oxidant streams can be categorized as "solely oxidant" streams, since their only role consists in providing the oxidant (the oxygen molecules needed for combustion) to the combustion zone. To date, none of these oxygen-enrichment schemes has been successfully adapted to solid-fuel applications, such as pulverized coal-fired boilers, due to problems associated therewith that are unique to solid-fuel media and their transportation, as described below.

Gas- or oil-fired furnaces usually require only two types of air streams. The first of these types is typically positioned at the burner level, and can comprise as much as 100 percent of the air required for complete combustion. The second type, if necessary, is positioned apart from the burner, and is injected in a "second combustion zone" to complete the combustion.

In the case of pulverized coal-fired boilers, and other devices where solid fuel particles (these can include any apparatus for burning a solid that is pulverized, micronized or otherwise exists in a fine enough state to be transported by a gas flow) require a conveying gas to transport it to the burner, the first oxidant-stream contacting the fuel in a "first combustion zone" consists of the conveying gas itself, typically air. This air stream conveying the solid fuel particles from a fuel storage or milling device (e.g., a coal pulverizer) to the burner is often referred to as "primary air," and corresponds to about ten to twenty percent of the overall air injected into the combustion chamber to effect complete combustion of the fuel. Note that its function is more than that of the "solely oxidant" air stream described above; its primary function is to convey the fuel to the burner. Indeed, it need not be an oxidant at all—it could be a gaseous fuel, such as natural gas, or an inert gas, such as nitrogen. Currently, it is often pragmatic to use air as the conveying gas. In any event, it is desirable that, regardless of the oxidant characteristics of this gas, it have sufficient volume and flowrate to accomplish the transportation of the solid fuel to the burner.

Figure 1:
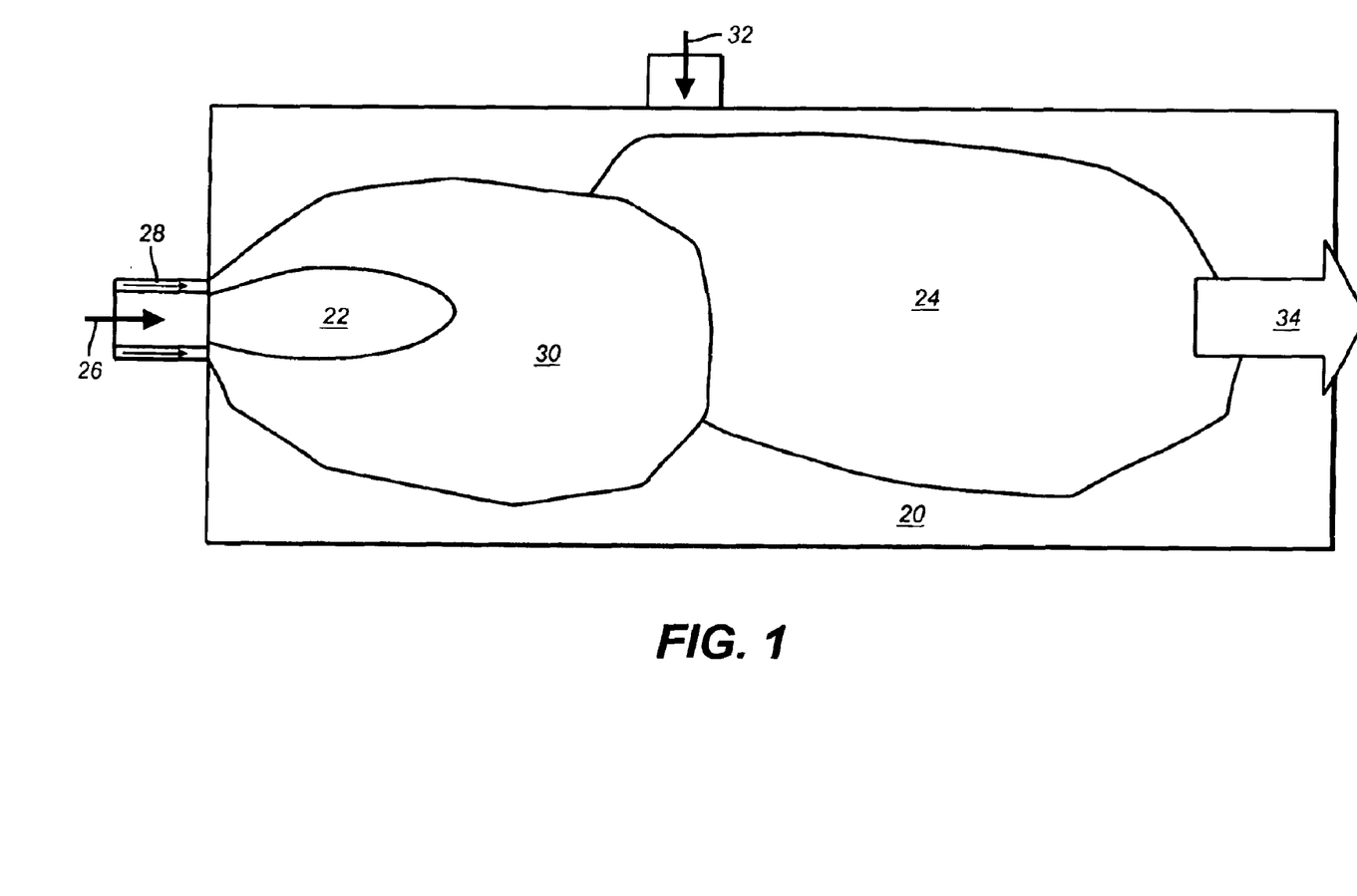
FIG. 1 is a schematic illustration showing a typical combustion system firing a solid fuel conveyed by a gas. The conveying gas often consists of air (primary air)

These conventional, pulverized coal-fired boilers use at least two, and sometimes three, types of air streams. Note that there can be multiple streams of each type in use, depending on the specific design of the structure. The first of these is the primary air stream, conveying the pulverized solid fuel. The second type, "secondary air," is injected at the burner level, around or near the primary air/fuel mixture. The third type, referred to as "tertiary air" or "overfire air (OFA)," is injected, if necessary, outside the burner in a second combustion zone, to complete the combustion process. This conventional coal-fired boiler is illustrated in FIG. 1.

Some studies reported in the literature show that increasing the temperature in the fuel rich ignition zone would allow a quicker and more efficient release of volatiles contained in the pulverized fuel, thus increasing the flame stability, enhancing the combustion efficiency, enabling an easier operation and saving fuel. It would also decrease the pollutant emissions, especially $NO_x$ formation, since fuel-rich combustion coupled with high temperatures is known to prevent fuel-bound nitrogen from being oxidized to nitrogen oxides, by reducing it to molecular nitrogen ($N_2$). This is more fully described, for example, in Sarofin, A. F. et al., "Strategies for Controlling Nitrogen Oxide Emissions during Combustion of Nitrogen-bearing fuels", PROCEEDINGS OF THE 69TH ANNUAL MEETING OF THE A.I.CH.E., Chicago, November 1976, as well as in K. Moore, W. Ellison, "Fuel Rich Combustion, A Low Cost $NO_x$ Control Means for Coal-fired Plants," 25TH INTERNATIONAL TECHNICAL CONFERENCE ON COAL UTILIZATION & FUEL SYSTEMS, Clearwater, Fla., March 2000. To increase the temperature in the combustion, a well known process is to increase the local oxygen content, or in other words to release more energy per unit of volume (fuel/oxidant/flue gas volume). Oxygen-enrichment in the fuel-rich ignition zone will then help increase the local temperature and get the related benefits previously described. As the first air stream in contact with the fuel and as the only oxidant stream available in the very beginning of the combustion process, the primary air may seem to be suitable to get higher $O_2$ content in the ignition zone.

While it appears then theoretically desirable to enrich the primary air to increase the temperature in the fuel-rich ignition zone, two problems have in the past prevented adaptability of known techniques already used or described for secondary or tertiary air enrichment. First, the primary air, as opposed to all other oxidant streams, contains fuel particles. The existing fuel/primary air stream is then a flammable gas, which will become even more flammable if oxygen is injected into it. Oxygen-injection into the fuel conveying primary air must be handled with great care. Second, oxygen-enrichment of the primary air by replacing a portion of it (the function of which includes transporting the pulverized fuel) with the stoichiometric equivalent of oxygen would reduce the volume of the conveying gas and may adversely affect the characteristics of the fuel-carrying gas stream.

Thus, a problem associated with coal-fired burners and other pulverized solid-fuel, air-fired combustion systems that precede the present invention is that they produce an level of $NO_x$ emission that is unacceptable in view of existing environmental regulations.

Yet another problem associated with pulverized coal-fired burners and other pulverized solid-fuel burners that precede the present invention is that they are not susceptible to traditional oxygen enrichment techniques upstream from the point of ignition, as they would then bear an unacceptably high risk of premature ignition, explosion, or other detrimental effects.

Still another problem associated with pulverized coal-fired burners and other pulverized solid-fuel burners that precede the present invention is that they have not been successively modified to provide adequate combustion characteristics resulting in adequate reduction of $NO_x$ formation sufficient to meet environmental guidelines without expensive and complex $NO_x$ treatment apparatus.

Another problem associated with pulverized coal-fired burners and other pulverized solid-fuel burners that precede the present invention is that they have not been adaptable to oxygen enrichment that facilitates $NO_x$ reduction while at the same time permits a maintained flow of a conveying gas to facilitate flow of the pulverized fuel from storage to the burner.

An even further problem associated with pulverized coal-fired burners and other pulverized solid-fuel burners that precede the present invention is that they have not been provided with a multiplicity of oxygen enrichment tools that permit substantial reduction of $NO_x$ with the least amount of oxygen necessary.

Another problem associated with pulverized coal-fired burners and other pulverized solid-fuel burners that precede the present invention is that they have not been provided with a multiplicity of oxygen distribution variables so as to be retrofittable to provide optimal reduction of $NO_x$ with the least amount of oxygen.

For the foregoing reasons, there has been defined a long felt and unsolved need for a pulverized coal-fired burner or other pulverized solid-fuel burners that facilitates oxygen enrichment therein to effectively reduce $NO_x$ production while at the same time maintaining the operability and safety of the burner process.

SUMMARY OF THE INVENTION

Thus, a preferred embodiment of the present invention discloses a process for oxygen-enriched fuel conveying gas and related apparatus to inject the oxygen. Two main types of injection devices can be utilized, each facilitating rapid premixing between the injected oxygen and the fuel/conveying gas stream. This mixing can occur before any ignition takes place when the oxygen is injected before the fuel gas exit panel, or at the very first stages of the ignition phase, to enable quick reaction with the fuel particles. Therefore, the enrichment is performed proximate to the injection point at which the oxygen-enriched fuel conveying gas is introduced into the combustion chamber.

A first preferred injection device adaptable to the preferred embodiment comprises an oxygen lance located in the central portion of the fuel stream. A nozzle discharges oxygen into the central portion of the fuel duct proximate to the fuel duct terminus. The construction and operation of the discharge nozzle can be selected according to the particular flow characteristics desired. A second preferred injection device comprises an oxygen ring positioned around the fuel and conveying gas stream. A fuel duct terminates at or a short distance before the oxygen ring, enabling the oxygen to mix with fuel and conveying gas from the circumference of the fuel duct to the middle of the fuel duct. The construction and operation of the discharge nozzle can also be selected according to the particular flow characteristics desired.

An object of the present invention is to provide a pulverized coal-fired burner or other pulverized solid-fuel burner that produces an acceptably low discharge of $NO_x$.

Yet another object of the present invention is to provide a pulverized coal-fired burner or other pulverized solid-fuel burner that can be to traditional oxygen enrichment techniques upstream from the point of ignition while at the same time not posing an unacceptably high risk of premature ignition, explosion, or other detrimental effects.

Still another object of the present invention is to provide a pulverized coal-fired burner or other pulverized solid-fuel burner that can be successively modified to provide adequate oxygen enrichment, further providing a reduction of $NO_x$ production sufficient to meet environmental guidelines.

Another object of the present invention is to provide a pulverized coal-fired burner or other pulverized solid-fuel burner that is adaptable to oxygen enrichment that facilitates $NO_x$ reduction while at the same time permits a maintained flow of a conveying gas to facilitate flow of the pulverized fuel from storage to the burner.

An even further object of the present invention is to provide a pulverized coal-fired burner or other pulverized solid-fuel burner that can be provided with a multiplicity of oxygen enrichment tools that permit substantial reduction of $NO_x$ with the least amount of oxygen necessary.

Another object of the present invention is to provide a pulverized coal-fired burner or other pulverized solid-fuel burner that has been provided with a multiplicity of oxygen distribution variables so as to be retrofittable to provide optimal reduction of $NO_x$ with the least amount of oxygen.

These and other objects, advantages and features of the present invention will be apparent from the detailed description that follows.

BRIEF DESCRIPTION OF THE DRAWINGS

In the detailed description that follows, reference will be made to the following figures.

DESCRIPTION OF PREFERRED EMBODIMENTS

Conventional, pulverized coal-fired boilers use at least two, and sometimes three, types of air streams. As shown schematically in FIG. 1, a combustion chamber 20 is shown having a first combustion zone 22 and a second combustion zone 24. The first of the three inlet stream types, the primary stream 26, comprises primary air and fuel, and conveys the pulverized solid fuel. The second type, or secondary stream 28, is the "secondary air" injected into the burner, around or near the primary air/fuel mixture 26. The third type, or tertiary stream 32, is injected, if necessary, outside the burner ignition zone 30, in the second combustion zone 24, to complete combustion. It is understood that in these apparatus, multiple air streams of each type thus described (primary, secondary and tertiary) can be utilized—indeed multiple burners can be used; the following description will refer to each in the singular for simplicity). Flue gas 34 is formed and exhausted from the combustion chamber 20. Thus, the first combustion zone is the zone where the fuel reacts around the burner level. Secondary zones are sometimes desirable if $O_2$ is provided downstream from the burner before the furnace exit to provide more complete combustion downstream.

Figure 2:
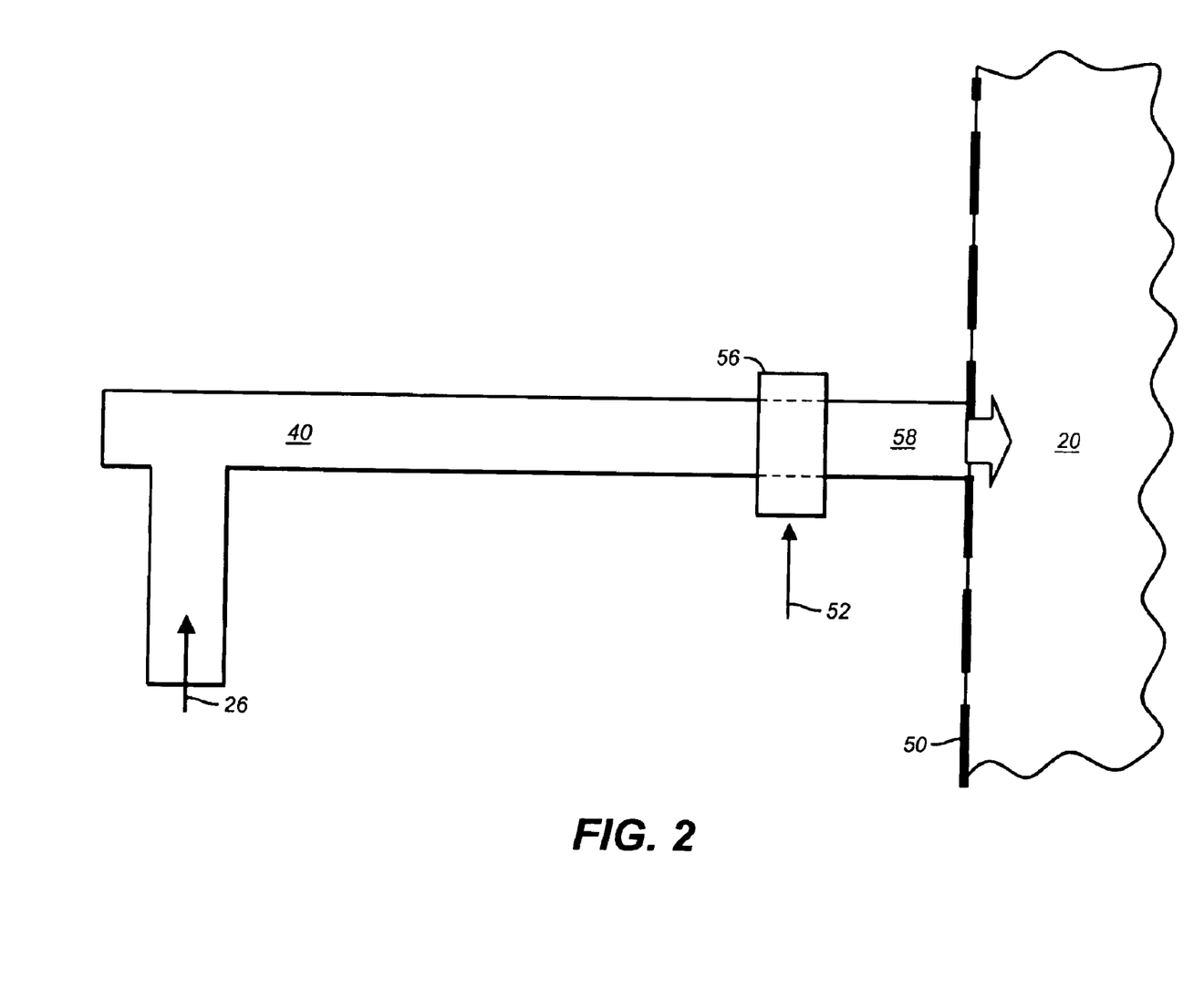
FIG. 2 is a schematic illustration of an embodiment of the present invention showing oxygen injection in the fuel conveying gas of a combustion system.
Figure 3:
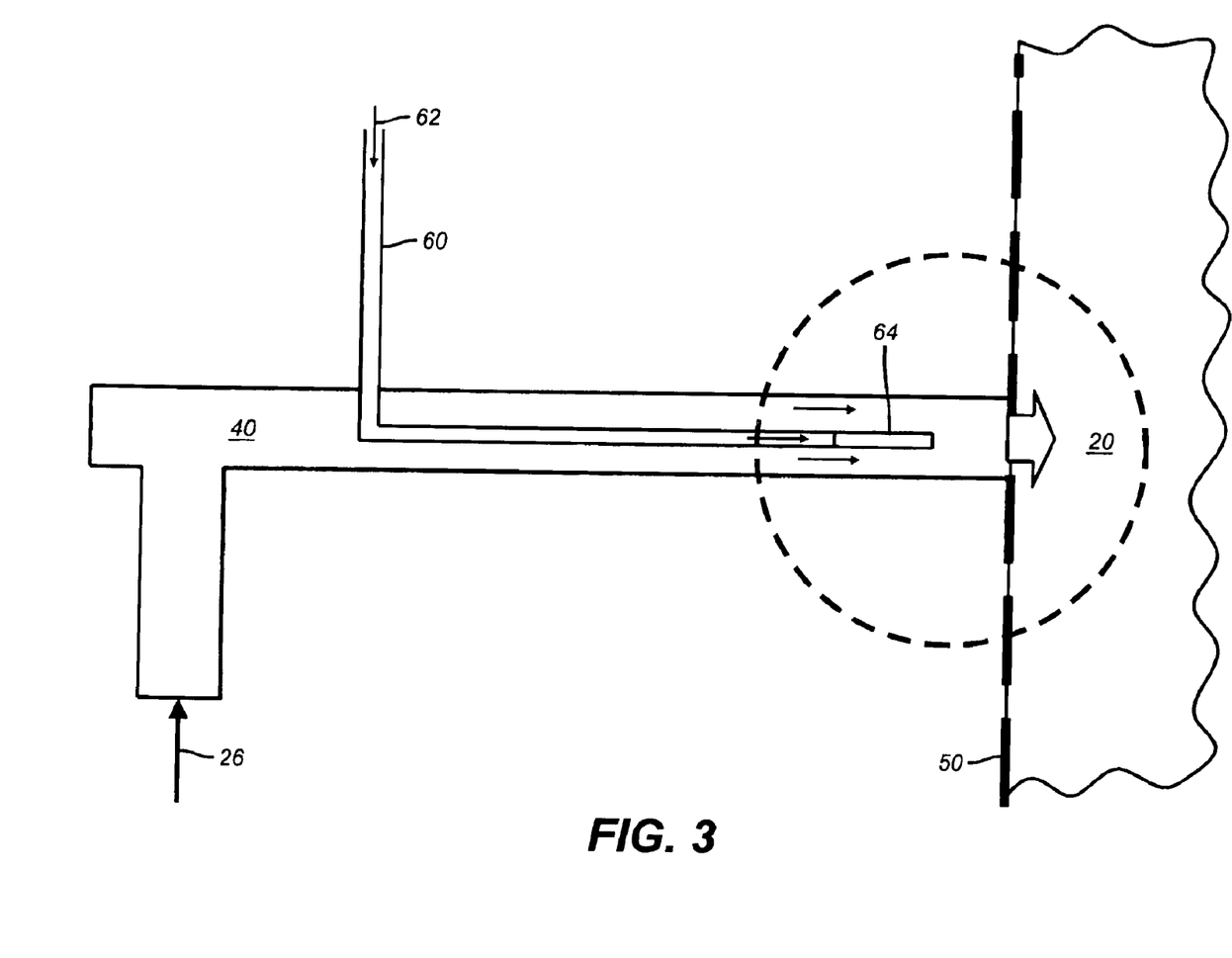
FIG. 3 is a schematic illustration of an embodiment of the present invention showing an injection device employing lancing techniques.
Figure 4:
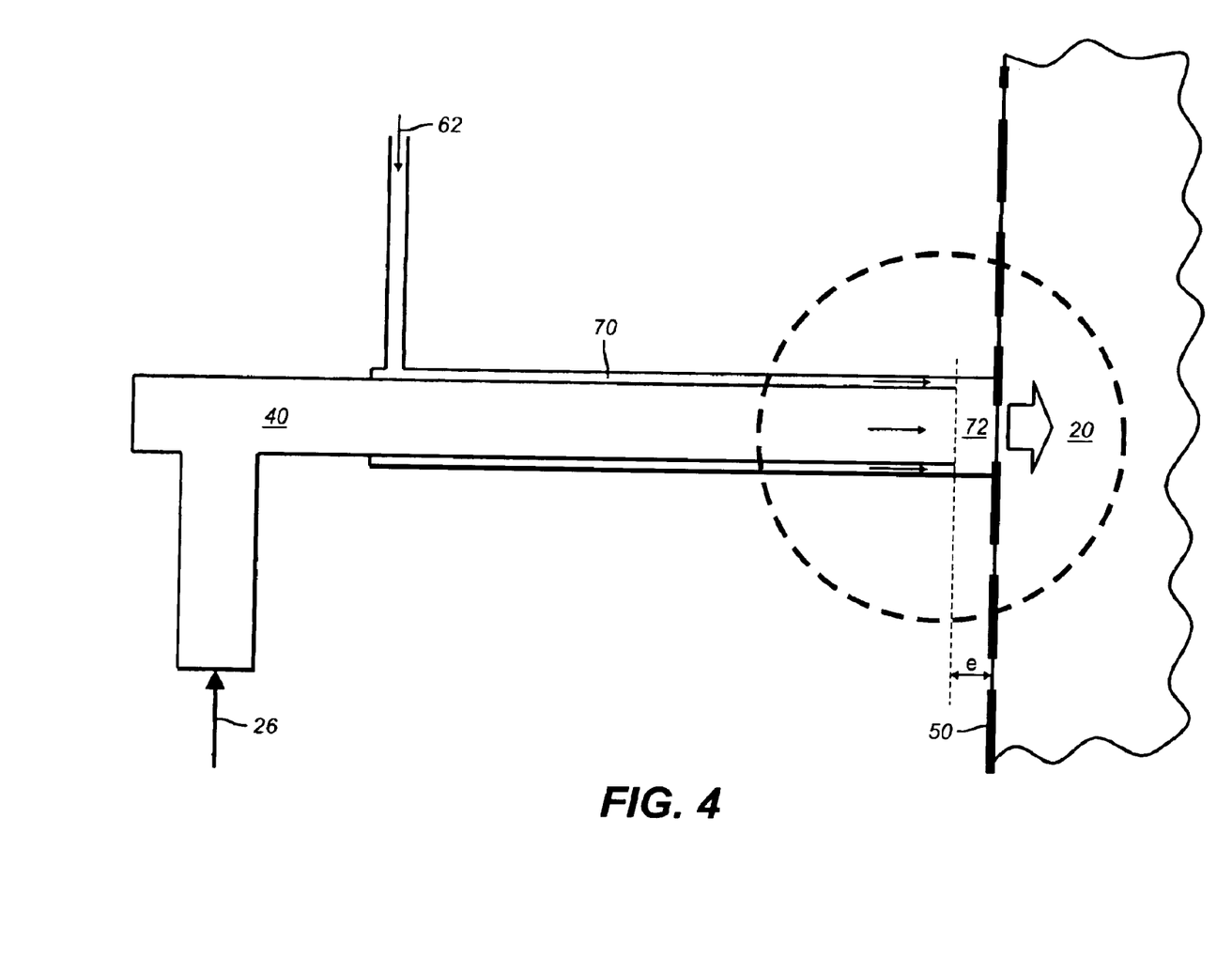
FIG. 4 is a schematic illustration of an embodiment of the present invention showing an injection device through an oxygen ring.

FIG. 2 illustrates a first preferred embodiment of a process for oxygen-enrichment and related apparatus to inject the oxygen. Two main types of injection devices can be utilized, each facilitating premixing injected oxygen with fuel and a conveying gas stream. For safety, the enrichment is performed proximate to the injection point at which the oxygen-enriched fuel conveying gas is introduced into the combustion chamber. FIG. 3 illustrates a first preferred injection device adaptable to the preferred embodiment, comprising an oxygen lance located in the central portion of the fuel stream. A nozzle discharges oxygen into the central portion of the fuel duct. The construction and operation of the discharge nozzle can be selected according to the particular flow characteristics desired. FIG. 4 illustrates a second preferred injection device comprising an oxygen ring positioned around the fuel and conveying gas stream. A fuel duct terminates at or a short distance before the oxygen ring, enabling the oxygen to mix with fuel and conveying gas from the circumference of the fuel duct to the middle of the fuel duct. The construction and operation of the discharge nozzle can also be selected according to the particular flow characteristics desired.

Referring now in more detail to FIG. 2, a process for improving the combustion and emission characteristics of any combustion system involving a gas to convey the pulverized, solid fuel is disclosed. The combustion system is adaptable in wall- or tangential-fired pulverized coal-fired boilers. The conveying gas, or "primary air," carries the solid fuel particles in a fuel gas 26 which is transported to the combustion chamber 20 through a fuel duct 40 terminating at the combustion chamber 20 at a fuel exit plane 50. An oxygen stream 52 containing at least some oxygen is injected into the duct 40 through an oxygen injection device 56. The injection device 56 is positioned to create a mixing zone 58 to mix the oxygen stream 52 and the fuel gas stream 26 immediately prior to or at the beginning of combustion of the fuel.

This process comprises the following steps. First, a "fuel gas" is created by mixing the fuel particles with a conveying gas. Second, the oxygen stream 52 is injected into the fuel gas 26 at a point located close to or at the fuel exit plane 50 (as illustrated, the injection point is before the fuel exit plane 50). Third, the oxygen equivalent amount of oxidant is adjusted in the other oxidant streams (secondary and, if applicable, tertiary oxidant) to maintain a predetermined amount of excess oxygen in view of the stoichiometric balance needed to complete combustion. This amount of excess oxygen is preferably maintained so that the $O_2$ content of the flue gas is maintained between 1.5 percent and 4.5 percent, and more preferably between 2.5 percent and 3.5 percent, and most preferably about 3.0 percent. For purposes of this application, all $O_2$ contents are stated by volume of dry gas (excluding $H_2O$).

In the foregoing, the conveying gas comprises any gas to convey fuel particles from a particle storage or generation location, e.g., mills, to the burner level and the combustion chamber. For example, this gas can comprise the primary air used to convey pulverized or micronized coal in a coal-fired boiler. This conveying gas can be air, a mixture of recirculated flue gas and oxygen (most preferably maintained to comprise about 80% $CO_2$ and about 20% $O_2$), a mixture of natural gas and air, or perhaps even natural gas. Generally, any appropriate gas stream that is readily available can be utilized. Oxygen-enrichment of the conveying gas is achieved by increasing the oxygen content in this conveying gas. In case of air, this would mean increasing the oxygen content of mentioned conveying gas above 21%. The injected "oxygen" or "oxygen stream" refers to any gas containing 21% to 100% $O_2$. The "fuel exit plane" is perpendicular to the direction of fuel gas flow and includes the injection point where fuel gas is introduced into the combustion chamber.

In other preferred embodiments, two categories of injection devices are adapted to provide oxygen enrichment in fuel carrying gases. Referring now to FIG. 3, the first of these embodiments comprises an oxygen lance 60 positioned in the central portion of the fuel duct 40 and adapted to inject oxygen 62 into the fuel gas 26. The lance 60 is terminated by a nozzle 64 enabling the oxygen release in the fuel gas 26.

To determine an optimal amount of oxygen to be injected into the fuel gas, it is desirable to determine the amounts of oxygen presented from all sources to maintain the stoichiometric balance of oxygen to fuel (including a predetermined excess) to result in complete combustion. It is desirable to improve the mixing characteristics of the apparatus, to permit selection of an oxygen concentration closer to the theoretical maximum.

Referring now to FIG. 4, another preferred embodiment is constructed and arranged to inject oxygen 62 into the fuel gas by introducing the oxygen around the fuel duct 40 with an oxygen ring 70. The fuel duct 40 terminates before the oxygen duct terminus to provide a mixing zone 72 located upstream from the combustion chamber 20. In this preferred embodiment, the oxygen content of the gas stream can be enriched to greater than 25%, since only the oxygen ring 70, and not the fuel duct 40, is in contact with the mixing zone 72. This provides an additional advantage over other apparatus which, to avoid the requirement for "oxygen-clean" transporting apparatus, limit the $O_2$ concentration in the fuel gas to less than 25%.

Figure 5:
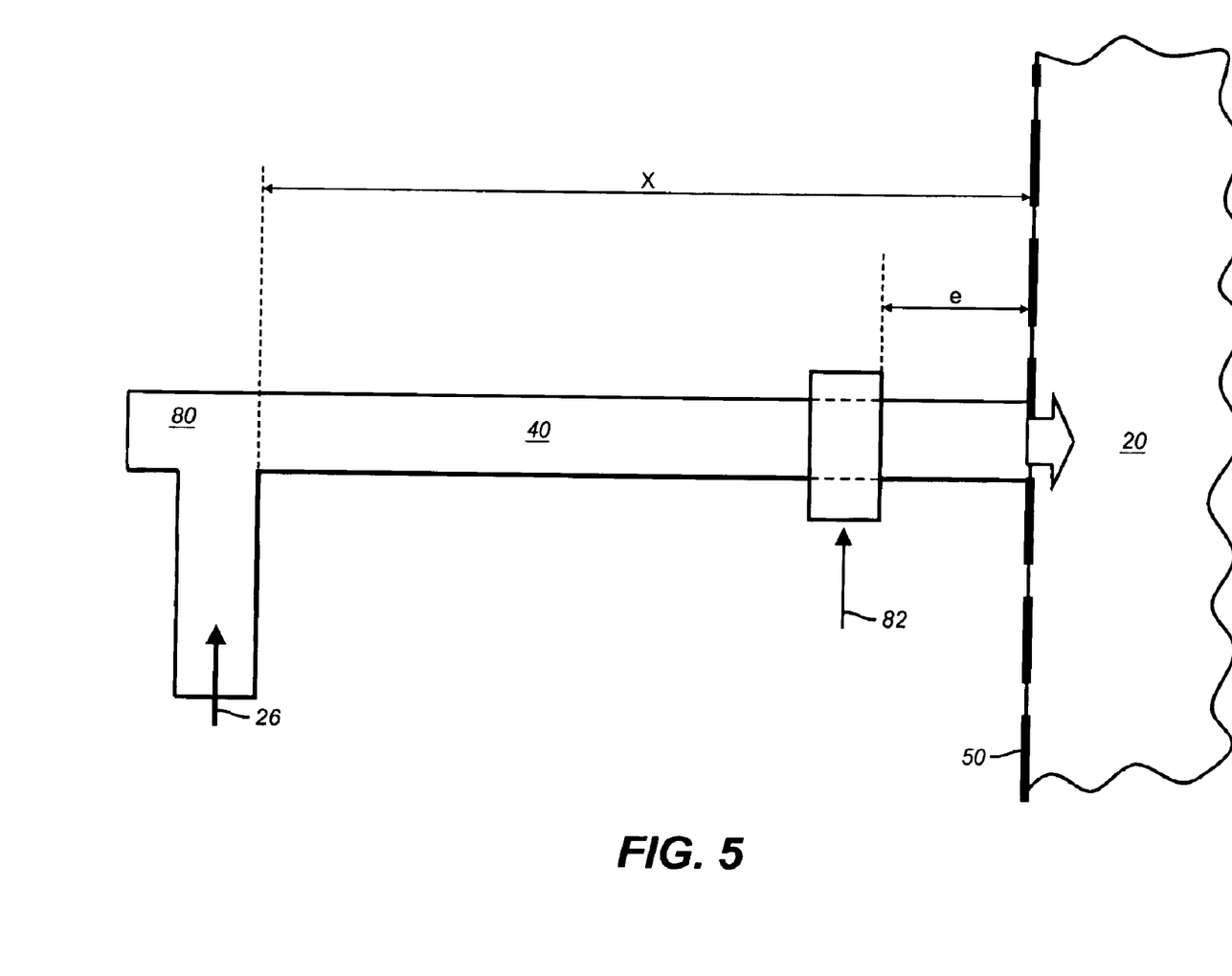
FIG. 5 is a schematic illustration of an embodiment of the present invention showing the location of an oxygen injection device.

Referring now to FIG. 5, a preferred position of the oxygen injection into the fuel gas is disclosed. The straight-path length x of the fuel gas duct 40 from a first curve 80 of the duct 40 to the combustion chamber 20 is disclosed. The distance e between the injection point 82 in the fuel gas and the fuel exit plane 50 is further disclosed. For safety, e is selected to be less than x to avoid high $O_2$ concentrations close to the duct's internal surface at the curve level. Because a long premixing zone is unnecessary, e is selected to be less than six times the diameter of the fuel gas stream.

Figure 6:
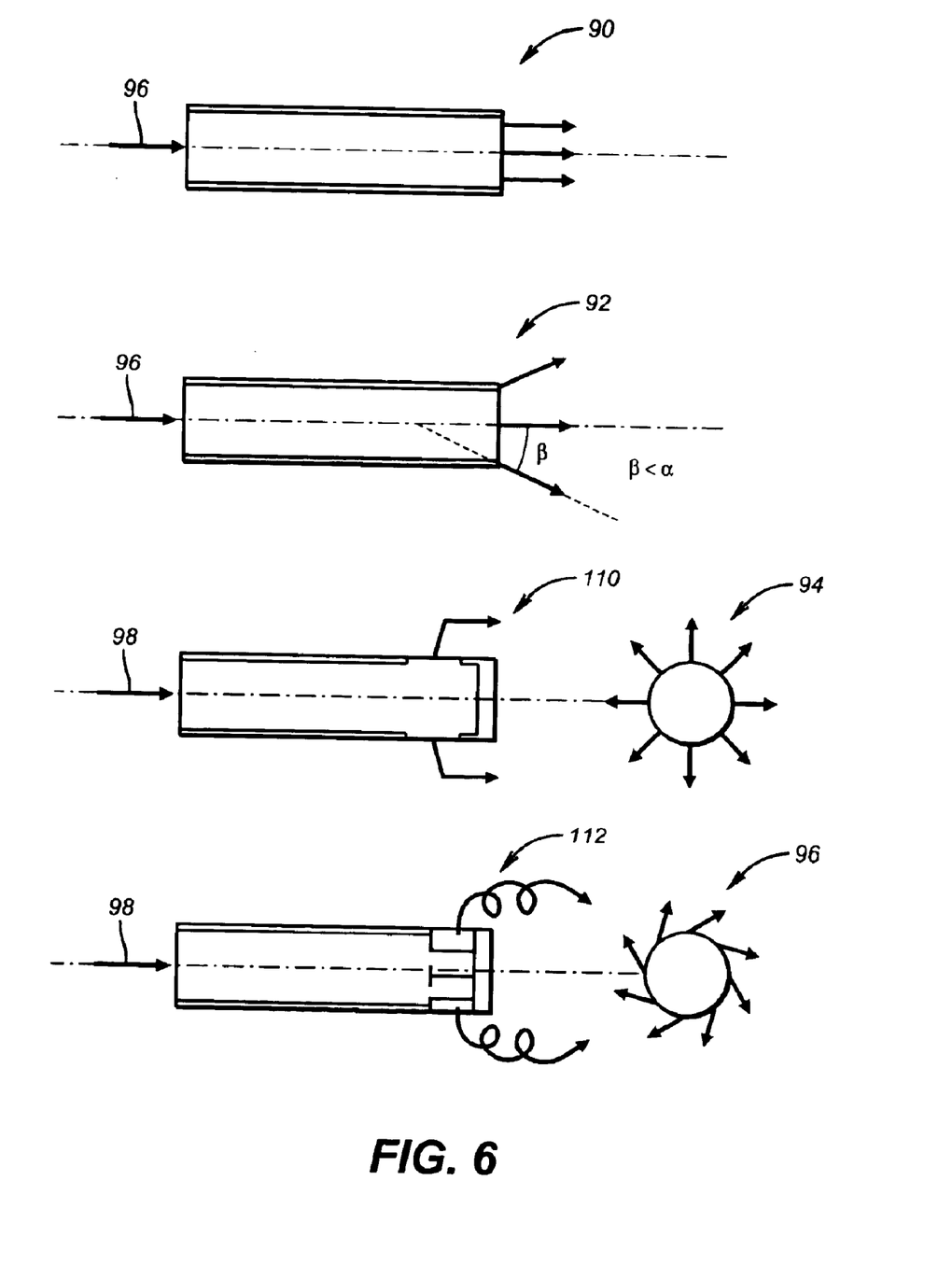
FIG. 6 is a schematic illustration showing injection nozzles to be adapted to $O_2$-lances.

Referring now to FIG. 6, four embodiments of lance nozzles are disclosed. The two embodiments 90, 92 in the upper portion of FIG. 6 comprise front $O_2$-injection apparatus 96, in which the $O_2$ injection is oriented parallel to the direction of the incoming fuel stream. The two embodiments 94, 96 in the lower portion of FIG. 6 comprise radial $O_2$-injection apparatus 98, in which the $O_2$ injection is oriented at a defined angle, preferably perpendicular, to the direction of the incoming fuel stream. Preferred swirling side $O_2$ injection apparatus 98 are more fully disclosed and described in Air Liquide's U.S. Pat. No. 5,356,213 and its EP 474,524, the teachings of which are hereby incorporated by reference, and are sold by Air Liquide subsidiaries under the trademark, The Oxynator™. As can be appreciated, these particular apparatus can be designed in any way that accomplishes optimal mixing in the particular geometry of the duct and combustion chamber, by providing parallel jets, inclined jets, a combination of each, or other configurations available to those of skill in the art.

These $O_2$ injection apparatus can either inject the oxygen stream in the same average direction as the fuel direction, as shown in the top most portion of FIG. 6 (straight nozzle), or with a preselected angle (one single angle or different angles from the same nozzle), as shown in the depiction located second from the top of FIG. 6. In the latter case, at least a portion of the $O_2$ is injected at an angle ranging from 0 to $\beta \approx 0$. The maximum angle of injection is selected to remain less than the angle $\alpha$ illustrated in FIG. 7, formed by the intersection of line A and line B. Consequently, no $O_2$ concentration spots are created near the duct wall due to formation of oxygen pockets. Thus, the oxygen stream can be injected using an oxygen lance having either a straight front injection nozzle 90, an inclined front injection nozzle 92, a side injection nozzle with spaced side apertures 94 or a side injection nozzle with swirling side apertures 96, or a combination thereof.

Note that nozzle tips 110, 112 are provided at the ends of the lance nozzles. It is further appreciated that, to select a given gas velocity of the oxygen stream exiting the lance, one can select a nozzle tip with an appropriate cross-sectional area of aperture. For example, if an gas velocity of the oxygen stream in the lance is X, given the desired volume of air specified by the oxygen calculations governing the combustion process, and the cross-sectional area of an unimpeded lance is Y, gas velocity exiting the lance can be doubled simply by providing a nozzle tip having a cross-sectional area of aperture of one-half Y. For the front injection nozzles, the nozzle tip cross-sectional area of aperture is always less than Y, so gas velocity exiting the lance can only be made greater than the gas velocity in the lance. However, for the side injection nozzles, it can be appreciated that the cross-sectional area of aperture can be greater than Y, so gas velocity exiting the lance can be made less than the gas velocity in the lance. Depending on the mixing geometries and other variables affecting the mixing of the enriched stream with the fuel stream, these considerations can be important.

Figure 7:
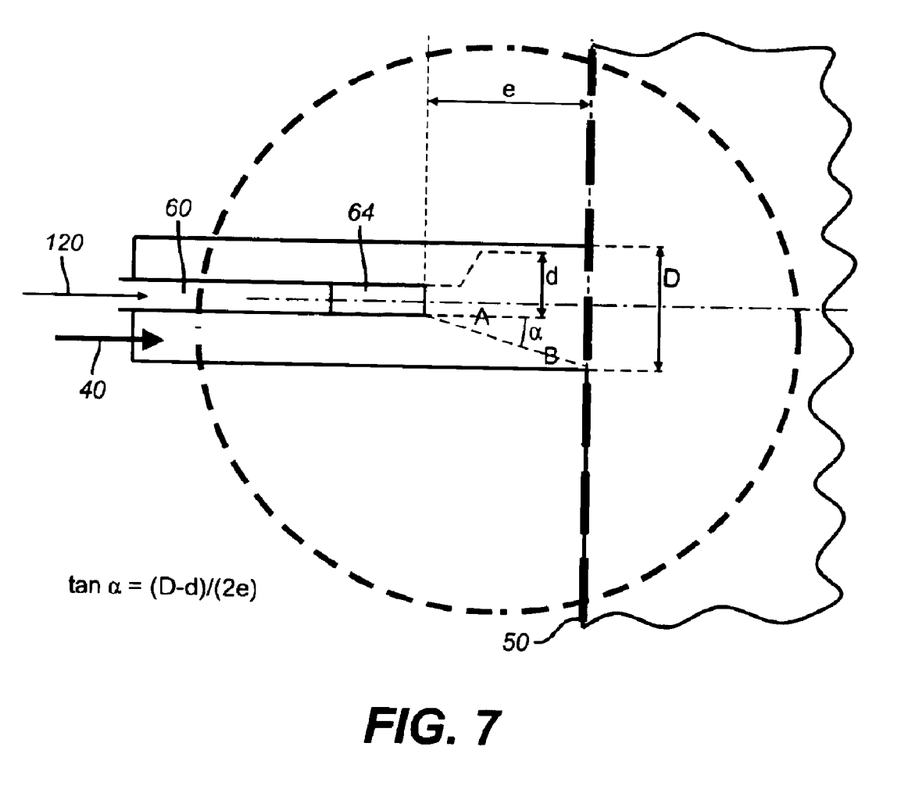
FIG. 7 is a schematic illustration illustrating a and diameters d and D.

Referring now more fully to FIG. 7, an oxygen lance 60 having a nozzle 64 is shown. The fuel duct 40 has a terminal inner diameter D. The oxygen lance 60 has a terminal inner diameter d. The oxygen lance 60 is oriented in the fuel duct 40 to extend in an injection direction 120, thereby defining an angle a to be the smallest angle formed between (1) a line extending from the lance terminal inner surface to the intersection of the fuel exit plane and the fuel duct terminal inner surface (as illustrated, the lower dotted line forming angle $\alpha$ and (2) a line extending from the lance terminal inner surface in the injection direction to the fuel exit plane (as illustrated, the upper dotted line forming angle $\alpha$). To prevent unwanted impingement of the oxygen enriched injection along the fuel duct walls, the injection point is selected to be a distance e from the fuel exit plane 50 such that the tangent of the angle $\alpha$ is less than or equal to (D−d)/2(e). Although not necessary, it is preferable to position the lance so that the fuel duct 40 extends in a direction substantially parallel to the direction of the oxygen lance injection direction 120, and that the oxygen injection location is located approximately in the center of the fuel duct 40.

Figure 8:
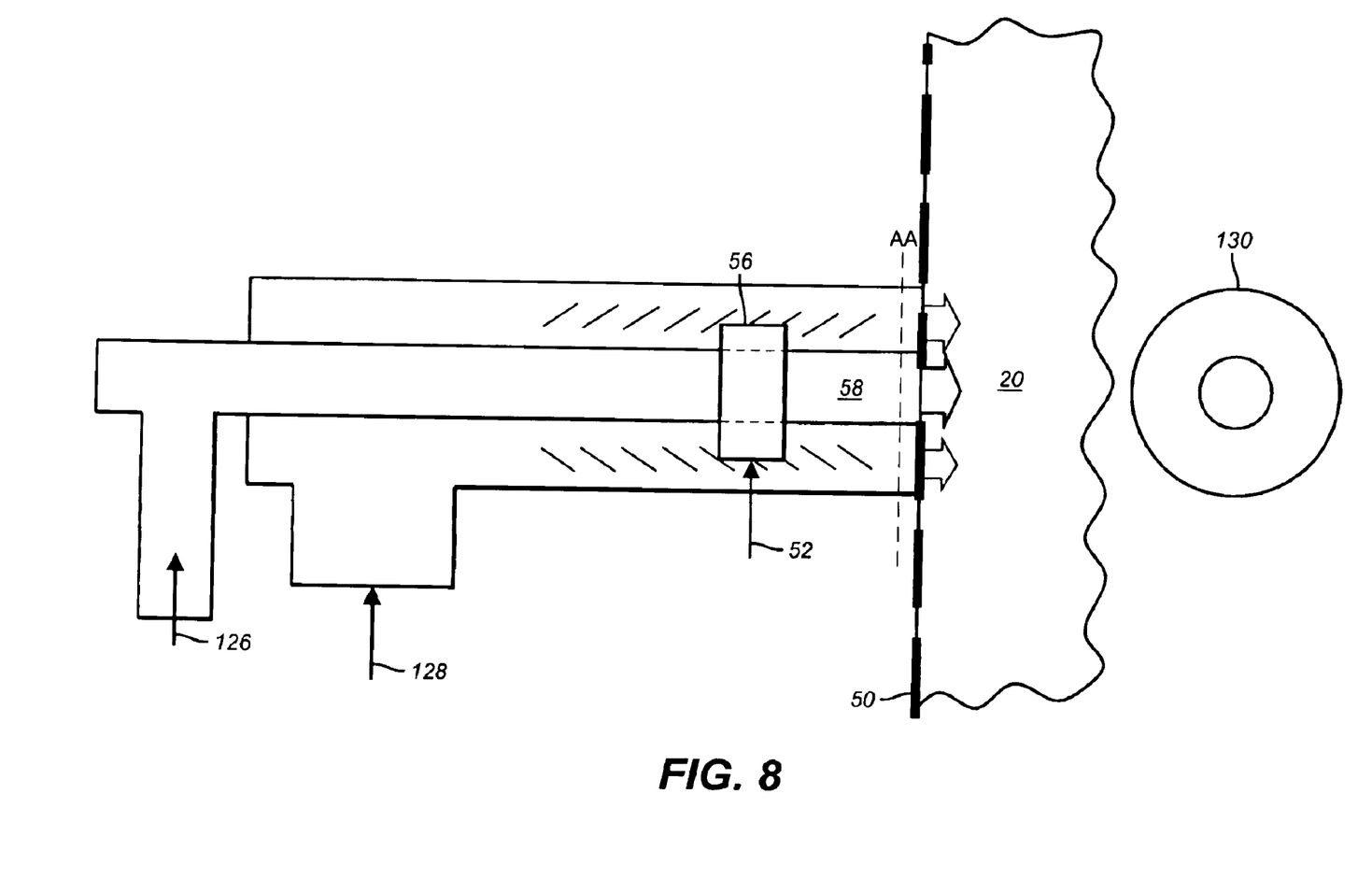
FIG. 8 is a schematic illustration of an embodiment of the present invention adapted for use in wall-fired boilers.
Figure 9:
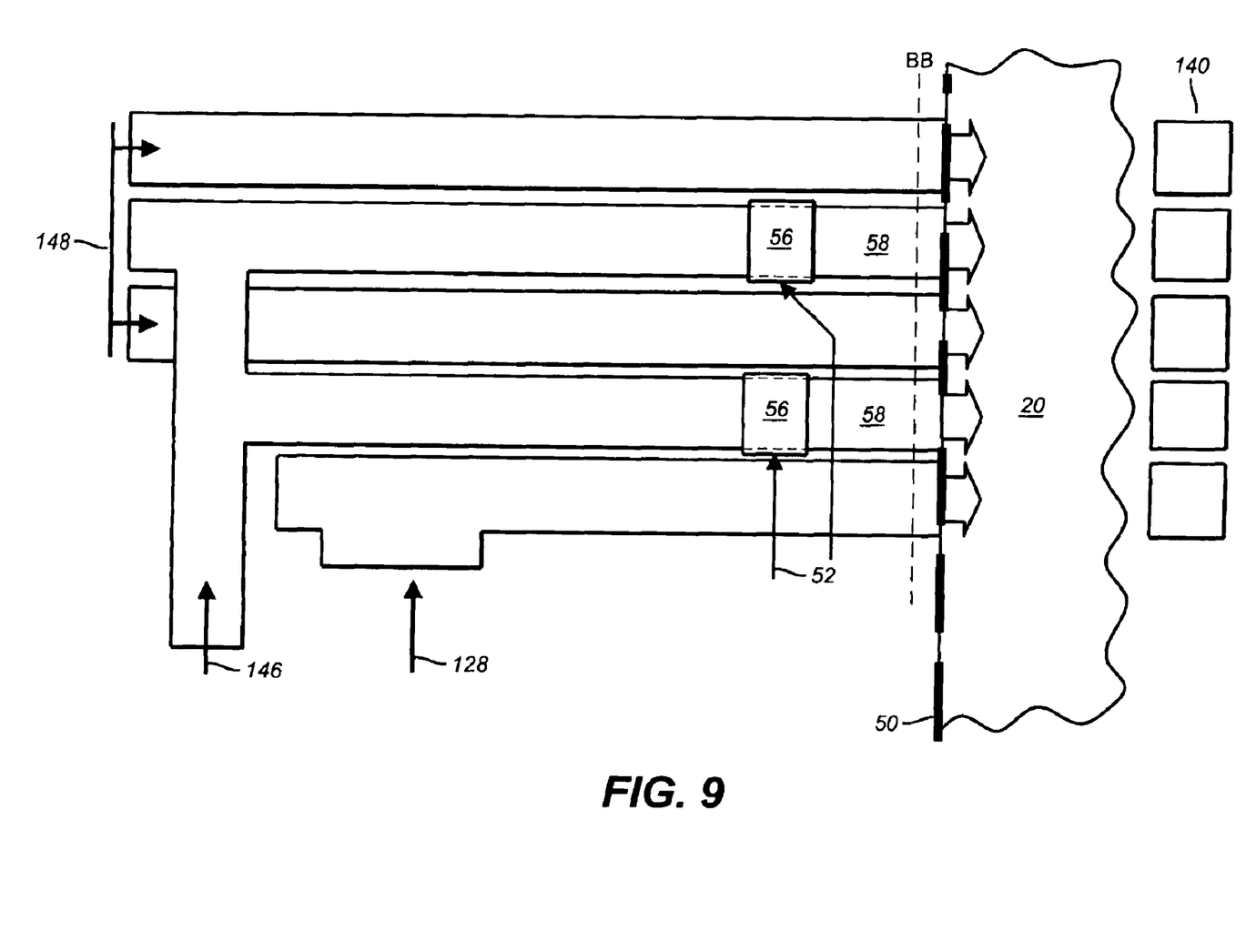
FIG. 9 is a schematic illustration of an embodiment of the present invention adapted for use in tangential-fired boilers.

Embodiments of the foregoing can be adapted to two types of pulverized coal-fired boilers, wall-fired boilers and tangential-fired boilers. Referring now to FIG. 8, wall-fired boilers (shown at 130 cross-sectionally along the line AA) commonly use circular burners, in which the "secondary air" is injected through an annulus 128 around the fuel/primary air duct 126. The wall-fired boiler has one or several of these burners, which can be positioned on the same wall or on different (generally opposite) walls of the boiler. Tangential-fired (T-fired) boilers often are provided with multiple burners, located on the four corners of the boiler. As shown in FIG. 9, at 140 (cross-sectionally along the line BB), a "burner" consists of a vertical array of alternating "secondary air" ducts 148 and fuel/primary air ducts 146. If more than one burner is implemented in a specific boiler, the preferred embodiment can be applied either to all or to some of these burners.

Thus, an improved process for burning solid fuel particles in a combustion chamber and creating a flue gas is disclosed. The method comprises creating a fuel gas stream by mixing the solid fuel particles with a conveying gas, transporting the fuel gas stream through a fuel duct terminating at the combustion chamber at a fuel exit plane and injecting an oxygen stream through an injection device into said fuel gas at an oxygen injection location selected to create a mixing zone to mix the oxygen stream and the fuel gas stream immediately prior to or coincident with combustion of the fuel. Operating parameters of the process can be varied to optimally reduce $NO_x$ emissions.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for improving a combustion system for burning solid fuel particles in a combustion chamber and creating a flue gas, the method comprising:

creating a fuel gas stream by mixing the solid fuel particles with a conveying gas;

transporting the fuel gas stream through a fuel duct extending toward the combustion chamber allowing the fuel gas stream to be introduced into the combustion chamber at a fuel exit plane, the fuel exit plane being coincident with a wall of the chamber;

injecting an oxygen stream through an injection device into said fuel gas at an oxygen injection location selected to create a mixing zone to mix the oxygen stream and the fuel gas stream, the mixing zone extending from a position upstream of the fuel exit plane.

2. The process of claim 1, further comprising selecting the injection device to enhance mixing of the oxygen stream and the fuel gas stream to reduce the formation of $NO_x$ during combustion of the fuel.

3. The process of claim 1, further comprising:

selecting a target $O_2$ content in the flue gas;

selecting the $O_2$ content of the oxygen stream;

selecting the flowrate of conveying gas desired to maintain the solid fuel particles and the conveying, gas in mixed relation so that the fuel gas stream can be transported through the fuel duct to the combustion chamber without separation; and adjusting the total amount of oxygen entering the combustion chamber to yield the target $O_2$ content in the flue gas.

4. The process of claim 1, further comprising:

selecting the injection device to enhance mixing of the oxygen stream and the fuel gas stream to reduce the formation of $NO_x$ during combustion of the fuel;

selecting a target $O_2$ content in the flue gas;

selecting the $O_2$ content of the oxygen stream;

selecting the flowrate of conveying gas desired to maintain the solid fuel particles and the conveying gas in mixed relation so that the fuel gas stream can be transported through the fuel duct to the combustion chamber without separation; and adjusting the total amount of oxygen entering the combustion chamber to yield the target $O_2$ content In the flue gas.

5. The process of claim 3, the target $O_2$ content in the fuel gas being selected to be between 1.5 percent and 4.5 percent by volume of the fuel gas.

6. The process of claim 3, the target $O_2$ content in the fuel gas being selected to be between 2.5 percent and 3.5 percent by volume of the fuel gas.

7. The process of claim 3, the target $O_2$ content in the fuel gas being selected to be about 3.0 percent by volume of the fuel gas.

8. The process of claim 4, the target $O_2$ content in the fuel gas being selected to be between 1.5 percent and 4.5 percent by volume of the fuel gas.

9. The process of claim 4, the target $O_2$ content in the fuel gas being selected to be between 2.5 percent and 3.5 percent by volume of the fuel gas.

10. The process of claim 4, the target $O_2$ content in the fuel gas being selected to be about 3.0 percent by volume of the fuel gas.

11. The process of claim 1 wherein said conveying gas is air.

12. The process of claim 1 wherein said conveying gas is a mixture of natural gas and air.

13. The process of claim 1 wherein said conveying gas comprises air and recirculated fuel gas.

14. The process of claim 1 wherein said conveying gas is a mixture of oxygen and recirculated fuel gas.

15. The process of claim 14 wherein the conveying gas comprises about 20% oxygen.

16. The process of claim 1 wherein said oxygen stream is injected using an oxygen lance.

17. The process of claim 16 wherein the oxygen lance has a front injection nozzle.

18. The process of claim 17 wherein the oxygen lance front injection nozzle is straight.

19. The process of claim 17 wherein the oxygen lance front injection nozzle is inclined.

20. The process of claim 17 wherein the oxygen lance nozzle is a side injection nozzle.

21. The oxygen lance of claim 20 wherein said side injection nozzle has spaced side apertures.

22. The oxygen lance of claim 20 wherein side injection nozzle has swirling side apertures.

23. The process of claim 1 wherein said oxygen stream is injected using an oxygen ring.

24. The process of claim 1, the fuel duct having a straight portion interposed between the fuel exit plane and a curve, the straight portion having a length x;

the oxygen injection location being selected to be a distance e from the fuel exit plane; and the fuel duct having an inner diameter D.

25. The process of claim 24 further comprising positioning the oxygen injection location to be greater than zero but less than 6 times D.

26. The process of claim 24 further comprising positioning the oxygen injection location to be greater than zero but less than x.

27. The process of claim 25 further comprising positioning the oxygen injection location to be greater than zero but less than x.

28. The process of claim 16, further comprising:

selecting a fuel duct having a terminal inner diameter D;

selecting an oxygen lance having a terminal inner diameter d;

orienting the oxygen lance in the fuel duct to extend in an injection direction, thereby defining an angle a to be the smallest angle formed between (1) a line extending from the lance terminal inner surface to the intersection of the fuel exit plane and the fuel duct terminal inner surface end (2) a line extending from the lance terminal inner surface in the injection direction to the fuel exit plane; and positioning the oxygen lance in the fuel duct such that the oxygen injection location is located a distance e from the fuel exit plane, such that the tangent of the angle a is less than or equal to $(D-d)/2(e)$.

29. The process of claim 28 in which the fuel duct extends in a direction substantially parallel to the direction of the oxygen lance injection direction.

30. The process of claim 28 in which the oxygen injection location is located approximately in the center of the fuel duct.

31. The process of claim 29 in which the oxygen injection location is located approximately in the center of the fuel duct.

* * * * *

UNITED STATES PATENT AND TRADEMARK OFFICE
CERTIFICATE OF CORRECTION

PATENT NO. : 7,066,728 B2  Page 1 of 1
APPLICATION NO. : 10/758607
DATED : June 27, 2006
INVENTOR(S) : Chatel-Pelage et al.

It is certified that error appears in the above-identified patent and that said Letters Patent is hereby corrected as shown below:

In column 9, Claim 4, line 42, please delete "In" and replace with --in--.

In column 9, Claim 5, line 46, please delete "fuel" and replace with --flue--.

In column 9, Claim 6, line 47, please delete "fuel" and replace with --flue--.

In column 9, Claim 6, line 49, please delete "fuel" and replace with --flue--.

In column 9, Claim 7, line 50, please delete "fuel" and replace with --flue--.

In column 9, Claim 8, line 53, please delete "fuel" and replace with --flue--.

In column 9, Claim 8, line 55, please delete "fuel" and replace with --flue--.

In column 9, Claim 9, line 56, please delete "fuel" and replace with --flue--.

In column 9, Claim 9, line 58, please delete "fuel" and replace with --flue--.

In column 9, Claim 10, line 60, please delete "fuel" and replace with --flue--.

In column 9, Claim 10, line 61, please delete "fuel" and replace with --flue--.

In column 10, Claim 13, line 2, please delete "fuel" and replace with --flue--.
In column 10, Claim 14, line 4, please delete "fuel" and replace with --flue--.
In column 10, Claim 28, line 48, please delete "end" and replace with --and--.

Signed and Sealed this

Tenth Day of October, 2006

JON W. DUDAS
*Director of the United States Patent and Trademark Office*